United States Patent
Bagchi et al.

(10) Patent No.: US 8,032,615 B2
(45) Date of Patent: Oct. 4, 2011

(54) DYNAMIC ONLINE MULTI-PARAMETER OPTIMIZATION SYSTEM AND METHOD FOR AUTONOMIC COMPUTING SYSTEMS

(75) Inventors: Saurabh Bagchi, West Lafayette, IN (US); Rajarshi Das, New Rochelle, NY (US); Yixin Diao, White Plains, NY (US); Marc Adam Kaplan, Katonah, NY (US); Jeffrey Owen Kephart, Cortlandt Manor, NY (US)

(73) Assignee: International Business Machine Corporation, Armonk, NY (US)

( * ) Notice: Subject to any disclaimer, the term of this patent is extended or adjusted under 35 U.S.C. 154(b) by 500 days.

(21) Appl. No.: 12/126,291

(22) Filed: May 23, 2008

(65) Prior Publication Data
US 2008/0221858 A1 Sep. 11, 2008

Related U.S. Application Data

(63) Continuation of application No. 10/698,880, filed on Oct. 31, 2003, now abandoned.

(51) Int. Cl.
*G06F 15/177* (2006.01)
(52) U.S. Cl. ............ 709/220; 709/221; 703/22
(58) Field of Classification Search .......... 709/220, 709/221; 703/22
See application file for complete search history.

(56) References Cited

U.S. PATENT DOCUMENTS

| | | | |
|---|---|---|---|
| 2003/0005030 A1* | 1/2003 | Sutton et al. | 709/200 |
| 2006/0277205 A1* | 12/2006 | Song et al. | 707/102 |
| 2007/0112696 A1* | 5/2007 | Vane et al. | 706/10 |
| 2008/0235079 A1* | 9/2008 | Barel et al. | 705/10 |
| 2009/0044173 A1* | 2/2009 | Kohno | 717/121 |

OTHER PUBLICATIONS

Bagchi et al., "Design and Evaluation of a Logger-Based Recovery Subsystem for Publish-Subscribe Middleware", International Symposium on Performance Evaluation of Computer and Telecommunication Systems (SPECTS 2002), San Diego, CA, 10 pages.

* cited by examiner

*Primary Examiner* — Mohamed Wasel
(74) *Attorney, Agent, or Firm* — Yee & Associates, P.C.; Louis J. Percello (57) ABSTRACT

A method and system performs dynamic online multi-parameter optimization for autonomic computing systems. A simplex is maintained. The system's performance is measured for the particular setting of configuration parameters associated with each point in the simplex. A new sample point is determined using the geometric transformations of the simplex. A current best point in the simplex can be resampled to determine if the environment has changed. If a sufficiently different utility value is obtained from a previously sampled utility value for the point in the simplex, the simplex is expanded. If the difference is not sufficient enough, then contraction of the simplex is performed.

35 Claims, 6 Drawing Sheets

DYNAMIC ONLINE MULTI-PARAMETER OPTIMIZATION SYSTEM AND METHOD FOR AUTONOMIC COMPUTING SYSTEMS

PROVISIONAL APPLICATION

This application is related to, and claims the benefit of priority to, U.S. Provisional Patent Application 60/486,306 filed on Jul. 11, 2003, which is hereby incorporated by reference.

This application is a continuation of application Ser. No. 10/698,880, filed Oct. 31, 2003, status pending.

BACKGROUND OF THE INVENTION

1. Technical Field

The present invention is directed to an improved computing system. More specifically, the present invention is directed to an improved method and system for dynamically determining configuration values for improved performance in an autonomic computing system based on geometrical simplex transformations in the underlying multi-dimensional parameter space.

2. Description of Related Art

The success of service-oriented Information Technology, such as Autonomic Computing, On-demand eBusiness and eCommerce, depends critically on the ability to provide information, goods, and services in a fast, efficient and cost-effective fashion. Unfortunately, the increasing complexity of the computing systems necessary to provide these services is rapidly outstripping human ability for system operation. This is especially true when it comes to optimization of system parameters for these complex computing systems.

The fundamental difficulties in real-time optimization of system parameters in large complex systems arise from a number of sources. In many situations, a good model of the system and the way the system interacts with the world is not available (or may be too expensive to obtain). The lack of such a system model prohibits the use of sophisticated analytical and simulation tools for online (i.e., real-time) or offline optimization of the system parameters.

The problem is further compounded by the fact that there may be multiple parameters that have to be optimized simultaneously to improve system performance. Since a model of the system is not accessible, there is little understanding of the relative importance of the different system parameters (in terms of how each parameter effects the system's performance) and of the potential nonlinear interactions between the different parameters (in terms of their combined effect on the system's performance).

In situations where a model of the system is not at hand, one widely adopted technique is to sparsely sample the multidimensional parameter space (say, in a regular grid-like manner) and adopt the parameter setting that provides the best performance among the sampled points. Unfortunately, due to the curse of dimensionality, the number of necessary samples increases exponentially with the number of parameters to be optimized. Thus, even for a small set of parameters, the cost and time needed for a reasonable sampling of the multidimensional parameter space may be too prohibitive. Moreover, for these reasons, such sampling and optimization cannot be performed dynamically in real-time.

In addition, a system's behavior may be stochastic in nature and/or it may operate in a noisy and dynamic environment, such that similar system configuration parameters may result in very different overall performance measures or utility values. Thus, the ability to use historical data to infer a system model is seriously jeopardized, especially in a dynamic environment where demand or the load that is placed on the system is changing continuously over time.

In spite of all the above difficulties, it is the administrator's job to (re)configure the system parameters and improve the system's performance (as measured by a given metric) while the system is in operation. This calls for new methods and apparatus for dynamic, online, multi-parameter optimization that can automatically and quickly configure and tune system parameters without human intervention. The focus of such methods is not necessarily on determining the provably optimal parameter settings, but on finding reasonably good solutions reasonably quickly. Such methods are likely to play a fundamental role in Autonomic Computing, On-demand eBusiness and eCommerce system where there is a significant benefit in providing superior performance in unpredictable complex environments.

Known mechanisms used to perform off-line multi-parameter optimization include the Direct Search methods, and its variants (e.g., simplex algorithm and pattern search). The popularity of such class of methods exist because (i) they tend to work well in practice, (ii) they can often avoid pitfalls that can afflict more elaborate methods, and (iii) they are simple and straightforward to implement; thus they can be applied almost immediately to many nonlinear optimization problems. These methods do not need to explicitly calculate derivative or gradient information in the parameter space. Typically, these methods maintain a set of points (called the simplex) that is obtained by directly sampling the parameter space. In addition, these methods use a variety of techniques for steep descent (but not necessarily methods of steepest descent) to arrive at near optimal solutions.

Unfortunately, a direct application of the Direct Search method (and its variants) to automatically configure and optimize system parameters in Autonomic Computing systems is likely to fail for a number of reasons. First, Direct Search methods (and its variants) do not work in dynamic environments, where the demand or the load on the system is changing continuously over time, and where the same parameter settings can provide different performance measures at different times. Direct Search methods were designed for static problems and have no built-in mechanism to handle dynamic environments.

Second, Direct Search methods work only for deterministic problems where there is no noise either in measurements of the system's performance on in the system's dynamics. Direct Search methods make the fundamental assumption that the same parameter setting is always going to provide the same performance measure. In noisy or stochastic environments, where such an assumption is not valid, Direct Search methods can fail dramatically in finding good solution regions quickly.

Third, Direct Search methods make certain assumptions about the nature of the parameters being optimized. Typically, Direct Search methods (and the variants) are designed to handle problems with either all real-valued parameters or all integer-valued parameters. In most systems, parameters come in both flavors, and it is necessary to configure and tune both types of parameters simultaneously. In such scenarios, existing Direct Search methods, and the variants, can fail spectacularly since they fail to take the differences in the underlying granularity of the parameter space into account.

Fourth, Direct Search methods, and the variants, cannot handle relational constraints between the parameters being optimized. In many problems of system configuration and optimization, there exist constraints that involve one or more parameters. For example, a set of constraints could indicate that:

$$x1+x2+x3=1.0 \qquad \text{constraint \#1.}$$

$$0<x1<=1.0 \qquad \text{constraint \#2.}$$

$$0<=x2<=1.0 \qquad \text{constraint \#3.}$$

$$0<=x3<=1.0 \qquad \text{constraint \#4}$$

where x1, x2, x3 are the system configuration parameters. Direct Search methods, and the variants, were designed for unconstrained problems and are highly inefficient in finding good parameter settings in constrained optimization problems. Thus they have not been employed in online constrained optimization problems.

Finally, Direct Search methods, and the variants, suffer from a number of pathological failure modes that prevent their direct application in many types of optimization problems. For example, in problems with real-valued parameters, the size of the simplex can become infinitesimally small; limiting the Direct Search method's ability to track changes in the optimal parameter settings in dynamic environments. On the other hand, in problems with discrete or integer values, the simplex can easily get stuck in a rut where the Direct Search method is unable to decide on a new point to sample. This pathological failure mode limits Direct Search method's ability to explore promising regions in parameter space.

Therefore, it would be beneficial to have an improved system and method for performing dynamic online multi-parameter optimization for autonomic computing systems that does not suffer from the drawbacks of the Direct Search methods discussed above.

SUMMARY OF THE INVENTION

The present invention provides an improved method and system for performing dynamic online multi-parameter optimization for autonomic computing systems. With the method and system of the present invention, a simplex, i.e. a set of points in the parameter space that has been directly sampled, is maintained. The system's performance with regard to a particular utility value, i.e. operational characteristic, is measured for the particular setting of configuration parameters associated with that point in the simplex. A new sample point is determined using the mechanisms of the present invention that will hopefully provide an improved system performance with regard to the utility value. The new point is determined by applying geometric transformations to the points in the current simplex. These geometric transformations may include reflections, extensions, contractions, expansions and translations.

The present invention provides mechanisms for limiting the size of the simplex that is generated through these geometric transformations so that the present invention may be implemented in noisy environments in which the same configuration settings may lead to different results with regard to the utility value. In addition, the present invention further includes a mechanism for resampling a current best point in the simplex to determine if the environment has changed. If a sufficiently different utility value is obtained from a previously sampled utility value for the point in the simplex, then rather than contracting, the simplex is expanded. If the difference between utility values is not sufficient enough, then contraction of the simplex is performed.

In addition, in order to allow for both real and integer valued parameters in the simplex, the present invention provides a mechanism by which invalid valued parameters that are generated by geometric transformations being performed on the simplex are mapped to a nearest valid value. This may lead to a reduction in dimensions of the simplex however. Thus, in order to avoid the reduction in dimensions of the simplex, the present invention provides a mechanism for checking to determine if the dimensionality of the simplex would be changed by the execution of a particular geometric transformation prior to applying the geometric transformation. If a new point generated by the geometric transformation would result in a reduction in the dimensionality of the simplex, the current point that is the basis for the geometric transformation is perturbed by a small amount and the dimensionality check is performed again.

Moreover, in order to handle constrained optimization problems, the present invention translates new points generated by geometric transformations that violate one or more constraints to the boundaries of the feasible region where all constraints are satisfied. The mechanism of the present invention uses a gradient that is based on a penalty value that is proportional to the distance between an infeasible point and its corresponding feasible setting. This gradient is used to move away from the infeasible region to a feasible boundary point.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a mechanism for determining optimum configuration parameters for autonomic computing systems, on-demand eBusiness and eCommerce systems, and the like. As such, the present invention is especially well suited for determining configuration parameters of server computing systems in distributed data processing environments. Therefore, in order to provide a context for the description of the preferred embodiments of the present invention, the following FIGS. 1 and 2 are provided as a brief description of an exemplary distributed data processing system and a server computing system in which, or for which, the mechanisms of the present invention may be implemented.

Figure 1:
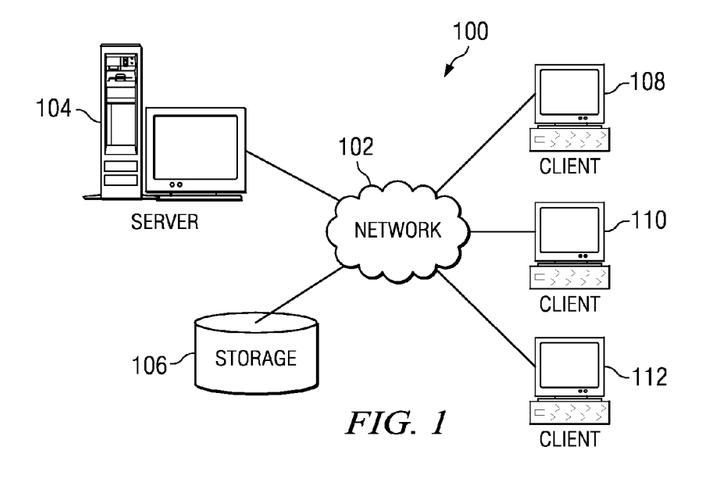
FIG. 1 is an exemplary block diagram of a distributed data processing system in which the present invention may be implemented.

With reference now to the figures, FIG. 1 depicts a pictorial representation of a network of data processing systems in which, or for which, the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
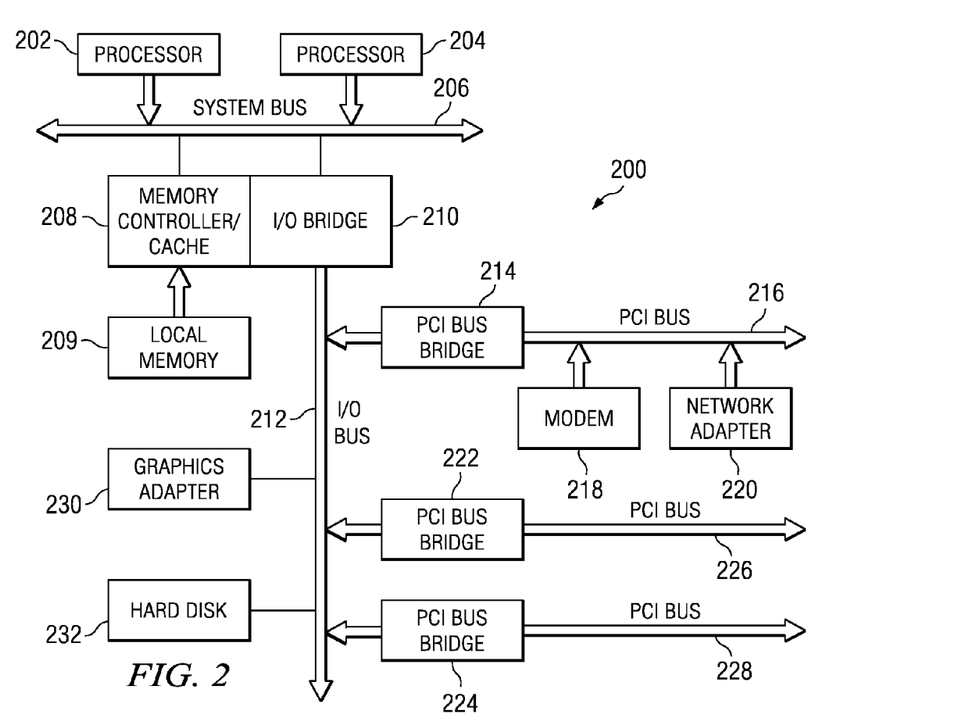
FIG. 2 is an exemplary block diagram of a server computing system in which the present invention may be implemented.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

It is assumed that the server 104 or 200 provides a service-oriented information technology service such as autonomic computing, on-demand eBusiness or eCommerce, or the like. Furthermore, it is further assumed that the owner/operator of the server 104 wishes to optimize the operation of the server 104 so that the services offered via the server 104 are provided in a fast, efficient and cost-effective fashion. As a result, the mechanisms of the present invention are utilized to ensure proper configuration of the server 104 so that an optimum operation of the server 104 is achieved.

In the prior art, an administrator of the server 104 may manually reconfigure the server 104 based on historical data, to change the configuration parameters in hopes of obtaining a better operation of the server 104. However, because of the complexity of the interaction of configuration parameters, it is often not possible for the human administrator to accurately identify the optimum configuration. In addition, because the server 104 operates in a dynamic environment, the optimum configuration for one set of conditions may not be the optimum configuration for another set.

Figure 3:
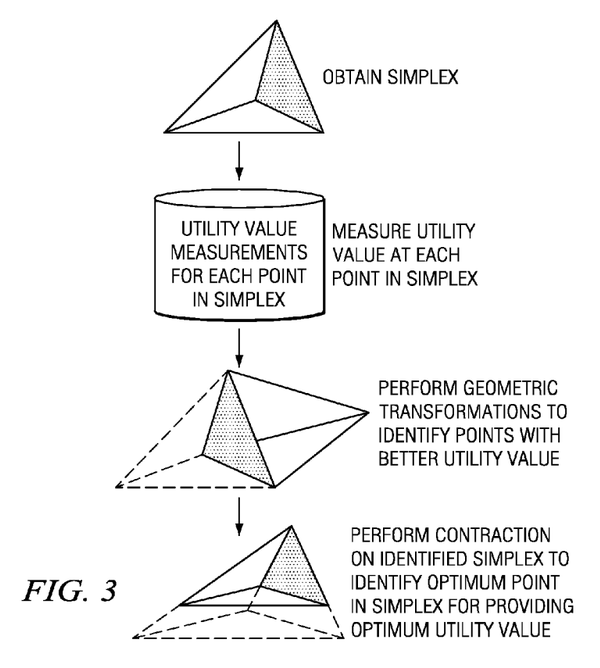
FIG. 3 is an exemplary diagram illustrating the methodology used by prior art Direct Search algorithms to identify an optimum set of configuration parameters in a simplex that generate an optimum utility value.

Alternatively, the administrator may make use of a static off-line analysis, such as Direct Search methods or their variants, in an attempt to achieve an optimum configuration for the server 104. An exemplary diagram illustrating a Direct Search methodology is provided in FIG. 3. As shown in FIG. 3, the Direct Search methodology involves obtaining a simplex of points. A simplex is a set of points in parameters space that have been directly sampled. That is, each point in the simplex represents a particular setting of configuration parameters and a vertex of the simplex. For a function of n parameters, a set of n+1 function values evaluated at n+1 points in parameter space defines a simplex in n dimensions. In two dimensions, i.e. n=2, the simplex would be a triangle. In three dimensions, i.e. n=3, the simplex would be a tetrahedron.

For example, a vertex point may be established for a combination of a particular set of configuration parameters of a server, autonomic system, eBusiness or eCommerce system, or the like. These parameters may include, for example, with regard to the logging subsystem of the Gryphon system discussed hereafter, growth threshold, reclaimed space, suspend threshold, ration of chunk size and message size; with regard to the Apache sever discussed hereafter, max-client and keep-alive, and the like.

At each vertex point, a utility value of interest is measured, or a function of the parameters is evaluated, in order to ascertain the resulting utility value obtained by configuring the system using the corresponding parameter values at that vertex point. This utility value is a performance value that is to be optimized. For example, this utility value for a particular setting of the parameters may include a weighted linear function of the measured response time, latency, cleaning overhead, and variation of log space usage in the logging subsystem of the Gryphon system discussed hereafter, and the like.

Thereafter, the geometric transformations of reflection and extension are performed to transform the simplex based on continued identification of vertex points that result in better utility values. Once no better utility value is obtainable via reflection and extension, contraction and shrinking may be performed to identify a vertex point that provides the optimum parameter settings for the system.

Figure 4:
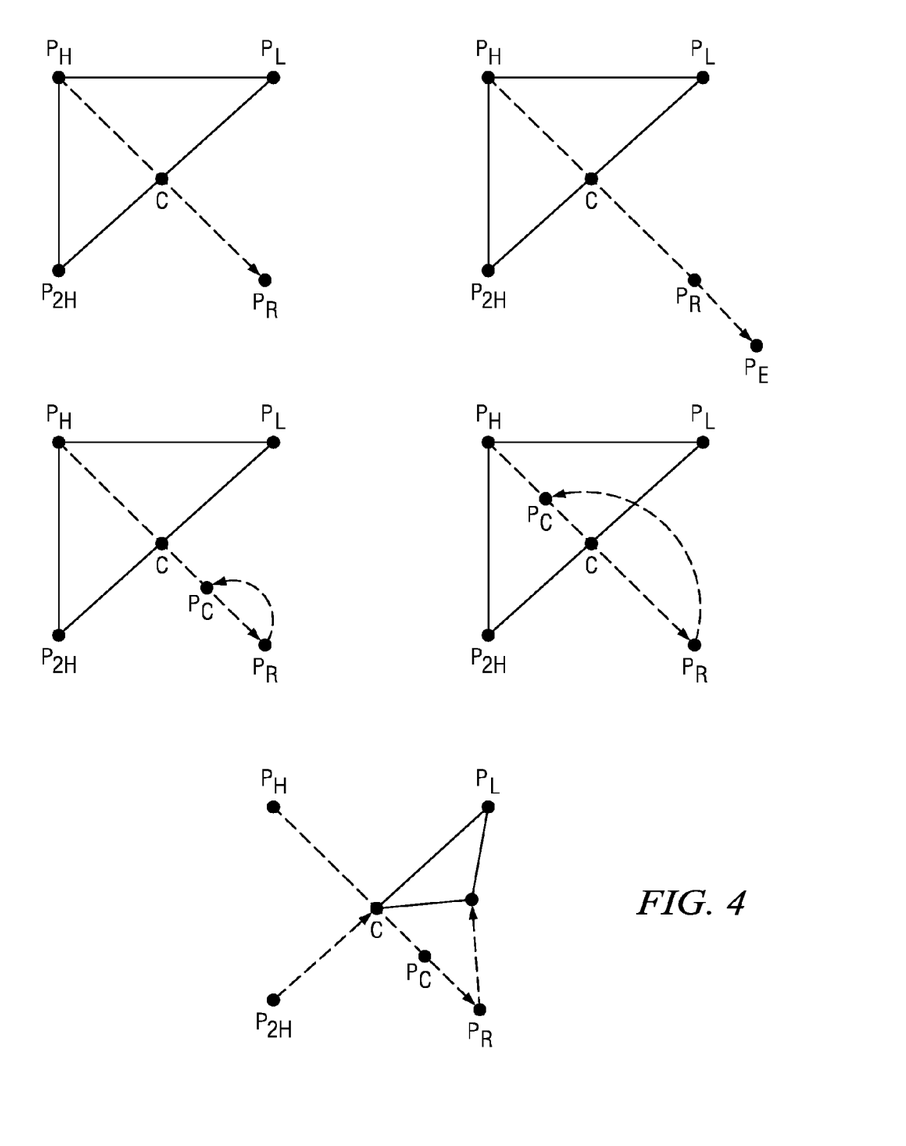
FIG. 4 is an exemplary diagram of geometric transformations that may be performed to a simplex to identify a more optimal point at which configuration parameters will generate a better utility value.

FIG. 4 provides a diagram illustrating the geometric transformations used to transform a given simplex in an attempt to arrive at an optimum vertex point. In order to begin the geometric transformations, the vertices are rank-ordered in terms of their utility value. This allows the identification of the highest utility value point $P_H$, second highest utility value point $P_{2H}$, and worst utility value point $P_L$, and the centroid C, or average, of all the points. Reflecting the highest point $P_H$ through C then generates a new point. Reflection is carried out according to the following equation:

$$P_R = (1+a)C - aP_H$$

where a is a positive constant called the reflection coefficient.

The utility value at this new point $P_R$ is then measured. Based on the measured utility value, a determination is made as to whether additional reflection or extension of the simplex is in order. If the measured utility value for the new point is between the measured utility value for the lowest valued point $P_L$ and the second highest valued point $P_{2H}$, then $P_R$ replaces $P_H$ in the simplex, and a new iteration of reflection is performed. The new point obtained from the extension is determined based on the equation:

$$P_E = cP_R + (1-c)C$$

where c is the extension coefficient and is greater than 1. If the measured utility value at this new point $P_E$, or the function value $F_E$ at this new point $P_E$, is less than the measured utility at the lowest valued point $P_L$ in the simplex, then $P_E$ replaces $P_H$ in the simplex. Otherwise, $P_R$ replaces $P_H$. The next iteration then begins with the new simplex generated from the above operations.

If the reflected point is still worse than every point in the simplex, i.e., $P_R > P_H$ or $P_R > P_{2H}$, the simplex contracts, under the assumption that the optimum point lies inside the simplex. Contraction generates a new point closer to the centroid C on the side which holds the most promise. For example, if $F_R < F_H$, the contracted point lies between C and $P_R$. If $F_H < F_R$, the contracted point lies between C and $P_H$. Contraction is defined by the equation:

$$P_C = bP\_ + (1-b)C$$

Where P_ is either $P_H$ or $P_R$, whichever has the lowest utility or function value, and b is the contraction coefficient, e.g., a number between 0 and 1. If the utility value of the contracted point $P_C$, i.e. the value $F_C$, is less than the utility value at point P_, then $P_C$ replaces $P_H$ and a new iteration begins.

If $F_C$ is greater than the utility value at point P_, the contraction has failed, and the entire simplex shrinks by the parameter d, retaining only $P_L$. Thus, each point in the simplex (except $P_L$) is replaced by $$P_i = dP_i + (1-d)P_L$$

The algorithm then continues with the next iteration. These steps of the Direct Search algorithm are illustrated in FIG. 4 for a simplex consisting of three vertices.

As discussed previously, while the Direct Search methodology works well for static off-line problems, they tend to fail when applied to dynamic on-line environments. The present invention solves the problems associated with the application of Direct Search methods to dynamic on-line environments by providing improvements to the Direct Search methodology that compensate for the dynamic and noisy nature of the on-line environment. The present invention modifies and extends Direct Search methods to overcome all of the limitations of known Direct Search methods and employs a new dynamic, online, multi-parameter optimization method for the self-configuration and self-tuning of Autonomic Computing systems.

Figure 5:
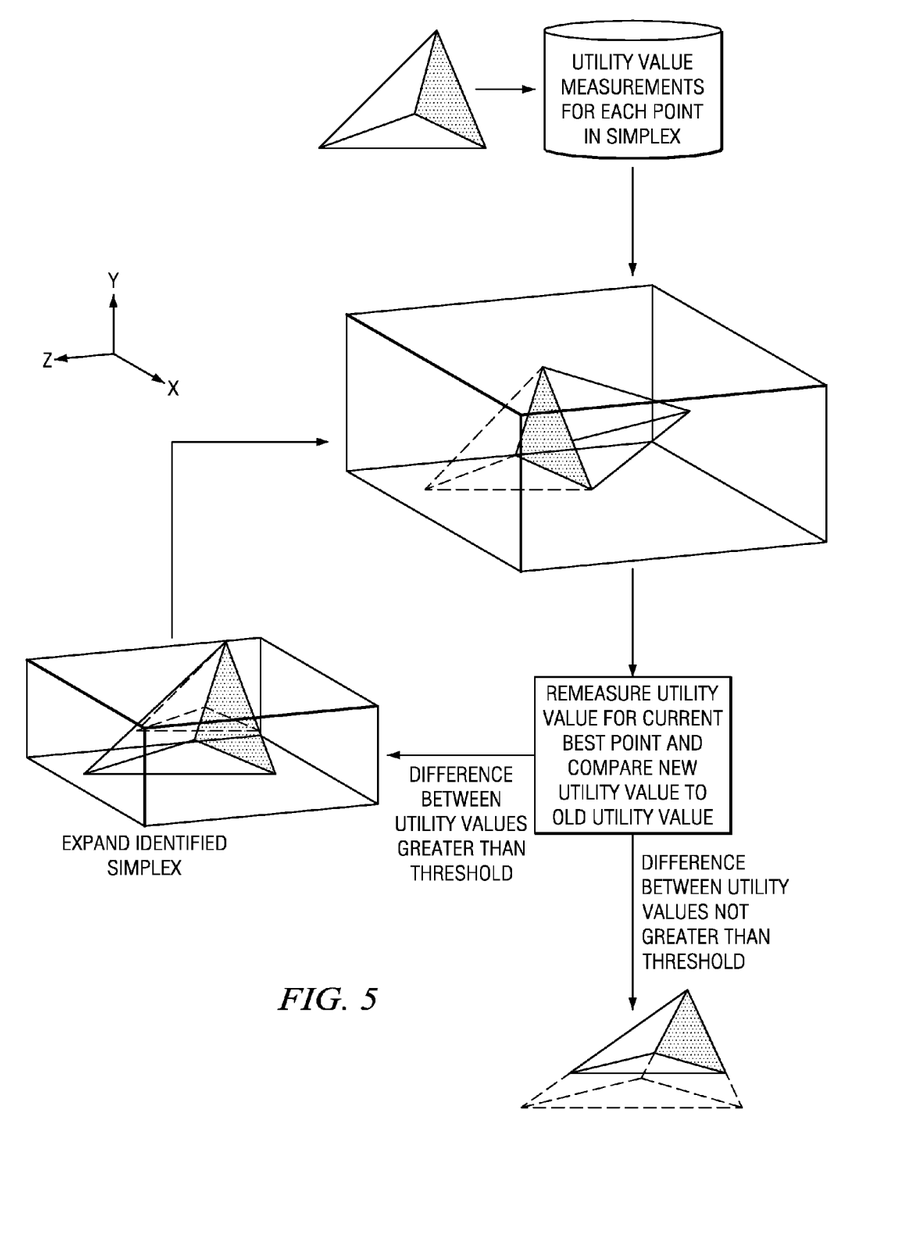
FIG. 5 is an exemplary diagram illustrating the methodology used by an exemplary embodiment of the present invention to identify an optimum set of configuration parameters in a simplex that generate an optimum utility value.

FIG. 5 is an exemplary diagram illustrating a methodology of one exemplary embodiment of the present invention. As in the Direct Search method, the present invention does not explicitly calculate derivative or gradient information in the parameter space. The present invention maintains a simplex, i.e., a set of points in the parameter space that has been directly sampled. For each point in the simplex, a utility value representative of the system's performance is measured for the particular setting of configuration parameters associated with that point in the simplex.

As in Direct Search methods, the basic objective is to sample new points in the hope of replacing the worst point in the simplex (i.e., the configuration setting with the worst utility value or performance measure) with a new point that has higher utility than the best point in the simplex. The position of the new point to be sampled is determined by applying geometric transformations to the points in the current simplex.

In order to be able to perform dynamic, online, multi-parameter optimization to work, it is necessary to determine when and when not to apply the various geometric transformations. The present invention provides mechanisms for determining when to apply such geometric transformations. For example, if a reflection on the simplex provides a new point that returns a utility value higher than that of any point in the current simplex, then the next transformation (called extension) extends the simplex in the same direction of the new point with hope of finding a new point that has even higher utility. Typically, in Direct Search methods, when all other transformations of the simplex have been exhausted, and none have produced a point with higher utility or better performance measure than the current best, then the size of the simplex is reduced by contraction.

The motivation here is that since the exploratory transformations outside the simplex failed to improve upon the current best solution, it is time to look inside the simplex to search for better solutions. This usually works fine in deterministic or static problems where any given point in the multi-dimensional parameter space returns one and only one utility value. Unfortunately, in noisy or dynamic environments, this type of contraction on the simplex severely inhibits the Direct Search method's ability to continue the search for better solutions as the method goes into a tailspin and contracts the simplex over and over again. In noisy environments, the simplex may contract to a point that is nowhere close to optimal parameter settings. On the other hand, in dynamic environments, the simplex may contract to a point that no longer represents a good setting of parameters under the current conditions.

Thus, it is imperative in dynamic and/or noisy environments to limit the size of the simplex from becoming too small, and thus being unable to track changes in the environment, or, conversely, becoming too big and miss regions of high utility inside the simplex. The present invention provides a mechanism for assigning an upper and lower threshold to the dimensions of the simplex that limits the size to which the simplex may be extended, expanded, or contracted. The upper and a lower thresholds on the size of the simplex are based on domain knowledge (e.g., threshold values suggested by the system designer or system administrator based on his or her knowledge of the system) and can be decided upon in advance and stored as parameters of the methodology of the present invention. For example, the size of lower threshold may be determined by the lowest resolution of significance (or availability) for each of the parameters. Similarly, the region that includes the highest and lowest possible values of all the parameters may determine the upper threshold on the simplex size.

In FIG. 5 the upper threshold on the size of a simplex is illustrated by the bounding box surrounding the simplex. As shown in FIG. 5, reflection and extension of the simplex may be performed such that the resulting simplex is within the bounding box established by the highest and lowest possible values of all the parameters. Thus, for example, if the parameters are x, y and z, the bounding box includes the highest and lowest possible values for the parameter x, y, and z. If the result of a geometric transformation is that the new point lies outside the bounding box, then the new point is remapped to the closest point on the boundary.

With regard to the lower threshold on the size of the simplex, a threshold value may be provided that limits the amount of contraction of the simplex that is permitted. Thus, when contraction of the simplex is performed, a determination may be made as to whether the contraction would result in a simplex that has one or more sides that have a length that is smaller than the lower threshold. In such a case, parameter values may be mapped to closest points on a simplex boundary that meets the lower threshold requirements.

To handle dynamic environments, the present invention extends Direct Search methods by allowing for the geometric transformation of expansion on the current simplex. Before committing to simplex contraction as a result of the other geometric transformations not resulting in a better utility value, the present invention re-samples a new set of points. For example, the current best point, current n number of best points, and the like, in the simplex could be resampled. As an example, in a preferred embodiment of the present invention may resample only the current best point. If a significant difference in the performance measure (or utility value) is found between the new and the old measurement, then it is assumed that the environment has changed, and the simplex is expanded to track the change in the environment (unless the simplex size has reached an upper threshold). Thus, each point in the simplex (except $P_L$) is replaced by $$P_i = mP_i + (1-m)P_L$$

where m is the expansion coefficient greater than 1.0. By preventing the simplex from contracting and forcing the sampling of new points, the present invention allows the simplex to climb uphill even if the underlying utility landscape is changing over time. On the other hand, if the new and the old measurement do not differ by a significant amount, contraction of the simplex is allowed (unless the simplex size has reached a lower threshold). Whether a difference between the new and the old measurement is significant or not is determined through domain knowledge and the system administrator can set the "significance" threshold in advance.

Similarly, in noisy or stochastic environments (with white or colored noise), the present invention uses domain knowledge before deciding upon the geometric transformation to apply on the simplex. The implication here is that the true utility value of a point in the simplex is said to be different than that of another point in the simplex only if the data, i.e., the measured utilities of the sampled points, suggests a statistically significant difference in the two measured values. Thus, if it is known that in a noisy system, repeated measurements of utility values for any particular configuration follows normal distribution, then standard statistical tests can be applied to determine, with a certain confidence level, that the utility value of a simplex is greater (or lesser) than the utility value at another vertex in the simplex.

Additional information necessary to test for statistical significance (such as whether noise is white or colored) can be acquired beforehand, and the level of significance can be set in advance based on the critical nature of the system and its environment. Once the points in the simplex are ranked with the help of the above method, all of the geometric transformations on the simplex, including reflection, extension, contraction, and expansion can be applied as before to search for better parameter settings. In addition to the above, the present invention provides mechanisms for allowing both real-valued parameters and integer-valued parameters in the simplex. While the simplex can be defined as usual with real and integer valued parameters in each configuration, operations on the simplex have to be defined more carefully as geometric transformations on the current simplex may result in a new point with impossible or illegal parameter values. For example, if a system has real-valued parameters x1 and x2, and an integer-valued parameter x3, operations on the simplex may results in a new setting of parameters:

$$Y = \{x1=14.9, x2=0.5, x3=1.83\}$$

This is a problem in that parameter x3 is no longer an integer.

The present invention solves this problem by mapping the setting of the integer-valued parameter to the nearest integer or the nearest legal value. In this example, x3 would be mapped to 2, and the point that is actually sampled is determined to be:

$$Y' = \{x1=14.9, x2=0.5, x3=2\}$$

While this mapping is simple to implement and works in general, it introduces another problem where the simplex is inadvertently reduced by one or more dimensions. Consider three parameter configurations Y1, Y2, and Y3, ranked according to decreasing utility, which constitute a three dimensional simplex in two-dimensional space:

$$1: Y1 = \{x1=20.0, x2=10\}$$

$$2: Y2 = \{x=10.0, x2=10\}$$

$$3: Y3 = \{x2=15.0, x2=20\}$$

Note that x1 is a real-valued parameter while x2 allows for only integer values. Now suppose some transformation on the simplex results in a new point at:

$$Y4=\{x1=15.0, x2=10.75\}$$

which is remapped to:

$$Y4'=\{x1=15.0, x2=10\}$$

in order to respect the fact that x2 can assume only integer values. If this point Y4' is now sampled and included in the simplex in place of Y3, then all three points in the new simplex (Y1, Y2, Y4') become co-linear (as they all lie on the line x2=10). Once the dimensionality of this simplex is reduced, it can only search along the x2=10 in the future. None of the geometric transformations can restore the original dimensionality of the simplex and the simplex is forever limited to searching in the reduced parameter space.

In problems with integer-valued parameters, before accepting any new point, the present invention checks to make sure that the dimensionality of the simplex remains unchanged. This is guaranteed by confirming the non-colinearity of the new point against all pairs of points in the current simplex. If the new point happens to reduce the simplex dimension, then it is perturbed by a small random amount, and the linearity check is performed again. Thus in the above example, Y4' could be remapped to:

$$Y4''=\{x1=15.0, x2=12\}$$

in order to avoid the co-linearity of x2. By adding this small amount of random perturbation, exploration of the parameter space is effectively encouraged and the tendency of the simplex getting stuck in endless cycles is avoided.

To handle constrained optimization problems the present invention translates a new point that violates one or more constraints to the boundaries of the feasible region where all constraints are satisfied. However, a naïve approach to this translation is liable to lead to reductions in the simplex dimension, and thus, special attention is required to handle the constraints.

Consider the problem with the following constraints:

$$x1+x2+x3=1.0 \quad \text{constraint\#1.}$$

$$0.0<=x1<=1.0 \quad \text{constraint\#2.}$$

$$0.0<=x2<=1.0 \quad \text{constraint \#3.}$$

$$0.0<=x3<=1.0 \quad \text{constraint\#4.}$$

The first point to note is that although there are three parameters, the present invention takes advantage of the constraints to simplify the parameter space to be searched. Since x3=1.0−x1 −x2, the present invention can simply search in the space of two parameters, namely x1, and x2, while respecting all the constraints.

Now consider a new point Y5={x1=0.5, x2=−0.2} found through some geometric transformation of the current simplex. Since x2<0.0, the present invention can translate Y5 to Y5'={x1=10, x2=0.0} to ensure satisfaction of constraint #2. However, it is not too difficult to realize that such a series of simple translations might result in a co-linear simplex where all points lie on the line x2=0.0.

The present invention avoids this problem by not re-mapping the coordinates of Y5 to those of Y5'. However, the utility value assigned to Y5 is set equal to the utility value of the configuration parameters for Y5' (which is directly sampled), minus some penalty value. In a preferred embodiment, this penalty value is a quadratic function of the distance between Y5 and Y5', although other penalty values may be used without departing from the spirit and scope of the present invention. This technique allows all the geometric transformations to be applied without modification. On the other hand, mapping of the utility value minus the penalty discourages search in the infeasible regions. Since the magnitude of the penalty is proportional to distance between the infeasible point and its corresponding feasible setting, the simplex can infer this gradient information and move away from the infeasible region.

Thus, the present invention improves upon known Direct Search methods by including mechanisms for limiting the size of the simplex generated through simplex geometric transformations in order to ensure that the simplex remains at a size that ensures that the simplex is large enough for the mechanisms of the present invention to be able to track changes in the environment and small enough to identify regions of high utility within the simplex. Moreover, the present invention provides a mechanism for permitting expansion, rather than contraction, of a simplex when a determination is made that changes in the environment have occurred. In addition, the present invention provides a mechanism for selecting geometric transformations to be applied based on whether differences in the utility values of simplex points are statistically significant or not. Furthermore, the present invention provides a mechanism for permitting the inclusion of real and integer valued parameters in the simplex and ensuring that geometric transformations on such a simplex do not result in invalid points being utilized or a reduction in the dimensionality of the simplex. Also, the present invention provides a mechanism for ensuring that new points identified by the geometric transformations of the simplex do not violate established constraints and avoid reduction in dimensionality of the simplex.

Figure 6:
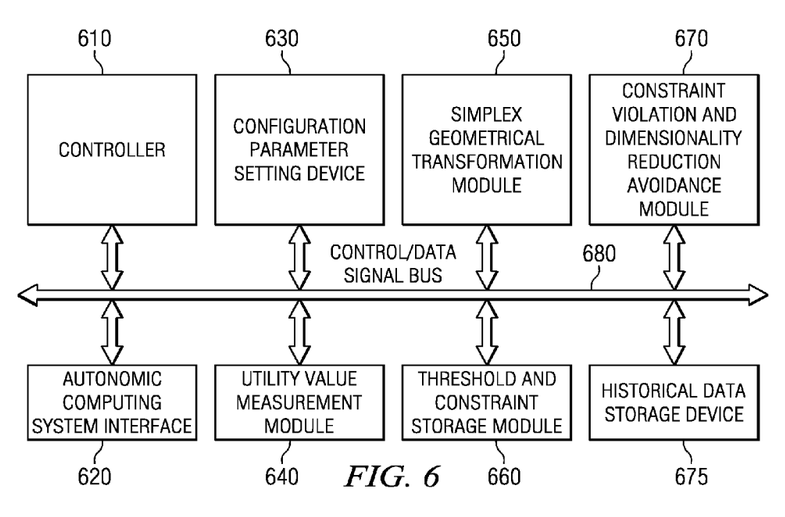
FIG. 6 is an exemplary block diagram of a dynamic on-line multiparameter optimization device in accordance with one exemplary embodiment of the present invention.

FIG. 6 is an exemplary block diagram of a dynamic on-line multi-parameter optimization device in accordance with one exemplary embodiment of the present invention. The elements shown in FIG. 6 may be implemented in hardware, software, or any combination of hardware and software. In a preferred embodiment, the elements shown in FIG. 6 are implemented as software instructions executed by one or more processing devices.

In addition, the on-line multi-parameter optimization device may be implemented in the autonomic computing system being configured using the on-line multi-parameter optimization device, or may be a separate device from the autonomic computing system that is being configured. In a preferred embodiment, the on-line multi-parameter optimization device is integrated with the autonomic computing system and operates in consort with the autonomic computing system.

As shown in FIG. 6, the on-line multi-parameter optimization device includes a controller 610, an autonomic computing system interface 620, a configuration parameter setting device 630, a utility value measurement module 640, a simplex geometrical transformation module 650, a threshold and constraint storage module 660, a constraint violation and dimensionality reduction avoidance module 670, and a historical data storage device 675. The elements 610-675 are in communication with one another via the control/data signal bus 680. Although a bus architecture is shown in FIG. 6, the present invention is not limited to such and any architecture that facilitates the communication of control/data signals between the elements 610-675 may be used without departing from the spirit and scope of the present invention.

The controller 610 controls the overall operation of the on-line multi-parameter optimization device and orchestrates the operation of the other elements 620-675. The autonomic computing system interface 620 provides an interface through which utility measurements may be made and configuration parameters may be modified in accordance with the mechanisms of the present invention.

Configuration parameter setting device 630 performs the necessary functions for setting the configuration parameters of the autonomic computing system so as to obtain utility values for simplex vertex points. The configuration parameter setting device 630 may interface with hardware and/or software of the autonomic computing system to set the configuration parameters of the autonomic computing system. This may include, for example, modifying a configuration file of the autonomic computing system, interfacing with device drivers and changing their settings, changing settings in an operating system of the autonomic computing system, interfacing with servlets or running applications to change their operational parameters, setting values within registers of a network adapter, and the like.

The utility value measurement module 640 interfaces with the autonomic computing system to measure utility values for a particular setting of configuration parameters. For example, the utility value measurement module 640 may, in response to setting of configuration parameters to a particular set of values, obtain information about a performance characteristic of the autonomic computing system over a period of time in which that setting of configuration parameters is valid. This information may then be reduced to a utility value, such as by a statistical calculation, e.g., averaging, standard deviation, determining a median, etc. This utility value may then be stored in association with the configuration parameter settings as the utility for a particular point in the simplex.

The simplex geometrical transformation module 650 performs the simplex geometrical transformations of reflection, extension, contraction, and expansion, as discussed previously. This module 650 performs the bulk of the methodology set forth above with regard to performing the geometric transformations and determining new vertex points that may identify a better utility value.

The threshold and constraint storage module 660 stores the threshold information for defining the limits of the simplex and the constraints established for the simplex. This information is used by the simplex geometrical transformation module 650 to determine if a new point violates the threshold boundaries and is used by the constraint violation and dimensionality reduction avoidance module 670 to determined if the constraints are violated by a new point identified through geometric transformation.

In operation, the controller 610, upon the occurrence of an event, initiates a reconfiguration of the autonomic computing system. The event may be, for example, a periodic event that occurs automatically, such as the elapse of a certain amount of time since a last reconfiguration of the autonomic computing system, the current time equaling a scheduled time for reconfiguration, a detected degradation in performance with regard to a particular measured metric, or the like. In addition, the event may be the input of an instruction from an administrator indicating that a reconfiguration of the autonomic computing system is in order.

The controller 610, in initiating the reconfiguration of the autonomic computing system, instructs the simplex geometrical transformation module to begin an optimization procedure such as that described above. It is assumed that the initial simplex has been generated by monitoring of the operation of the autonomic computing system. However, if a simplex is not currently available, an initial simplex may be generated by instructing the configuration parameter setting device 630 to set the configuration parameters of the autonomic computing system to a particular set of values and then instructing the utility value measurement module 640 to measure a utility value for this setting of configuration parameters. This may be done a plurality of times to obtain vertex points for the initial simplex.

The simplex geometrical transformation module 650 may then perform reflection on the initial simplex to identify a new point at which a utility value is to be measured. A determination is then made as to whether this new point violates any established thresholds in the threshold and constraint storage module 660. If so, appropriate modifications to the new point are made as described above. In addition, any necessary modifications to the new point value because of integer and real values being present in the simplex are made while ensuring that the dimensionality is maintained. This may require the aid of the constraint violation and dimensionality reduction avoidance module 670 in ensuring that the dimensionality of the simplex is maintained.

The simplex geometrical transformation module 650 then instructs, via the controller 610, the configuration parameter setting device 630 and the utility value measurement module 640 to set the configuration parameters to those corresponding to this new point and measure the utility value for this point. A determination is made as to whether the utility value for the new point is a better utility value than the current best utility value in the simplex. If so, a determination is made as to whether any constraints are violated by this new point. If not, then the new point replaces the point with the worst utility value. If so, then the new point is modified as discussed previously to ensure that no constraints are violated and the dimensionality of the simplex is maintained.

The operation then continues in the manner previously described above with continued iterations until stopping criteria are met. At that time, the best utility valued point in the simplex is selected as the optimum configuration parameter setting for the autonomic computing system. The configuration parameter setting device 630 is instructed to set the configuration parameters of the autonomic computing system to these new values. The operation is then put back to sleep until the next event occurs.

The historical data storage device 675 stores the prior configuration parameter settings and their corresponding utility values for the autonomic computing system. Thus, the configuration parameter settings that were being used by the autonomic computing system as well as their corresponding utility values are stored in the historical data storage device 675 prior to the above optimization operations being performed. Each time the optimization operations are performed, additional entries may be added to this historical data storage device 675 indicating the configuration parameters that were being used prior to the optimization and their corresponding utility values. In this way, a historical representation of the change in configuration parameters may be built.

The configuration parameter settings and their corresponding utility values stored in the historical data storage device 675 may be used for many different purposes. For example, these historical configuration parameter settings may be used to build a model of the operation of the autonomic computing system so as to get a better understanding of how the autonomic computing system operates in a dynamic and noisy environment. New domain knowledge may be obtained through analysis of the configuration parameter setting historical data, e.g., statistical stability analysis, pattern analysis, etc. Patterns of configuration parameter settings may be identified in this historical data in order to provide greater insight as to the most probable optimized values for particular time periods of operation in the dynamic and noisy environments. These patterns may be used to help guide the search for optimum configuration parameters using the above methodology. A plethora of other uses of the historical configuration parameter setting information may be made without departing from the spirit and scope of the present invention.

Figure 7:
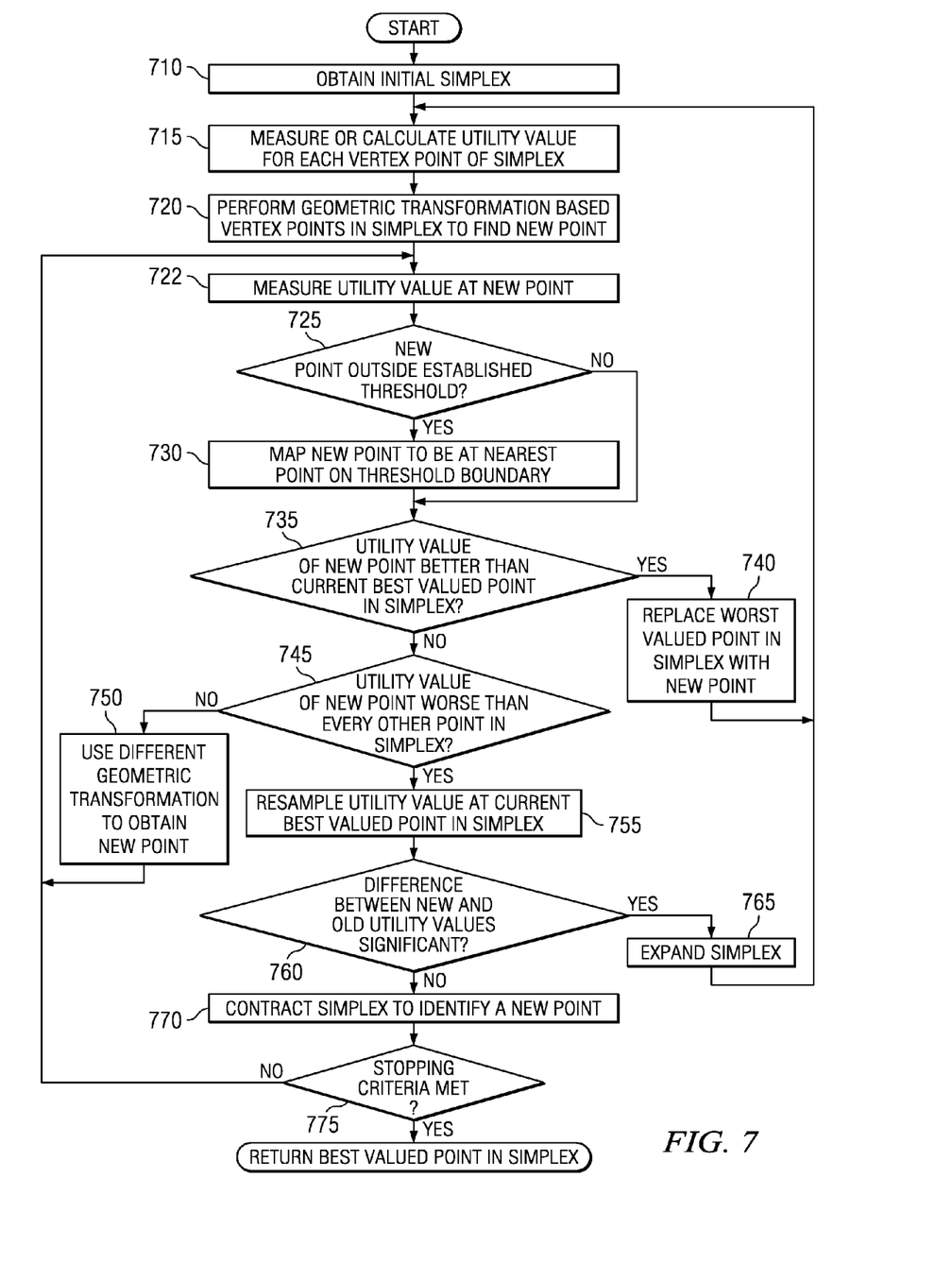
FIG. 7 is a flowchart outlining an exemplary operation of the present invention.
Figure 8:
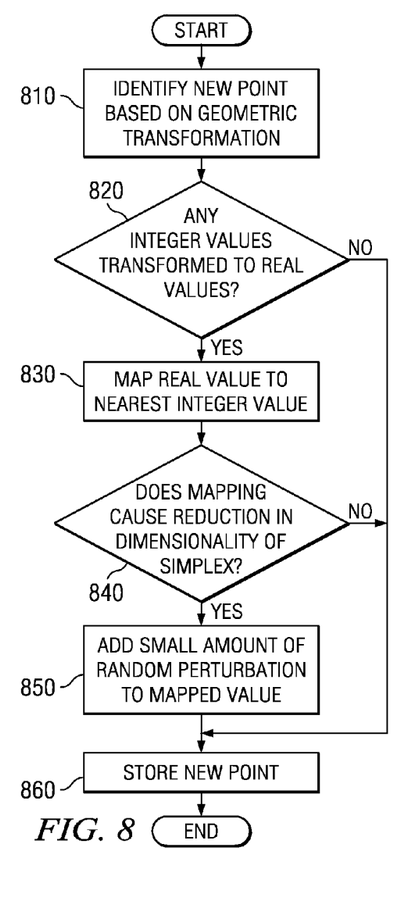
FIG. 8 is a flowchart outlining a process by which a new point is checked to determine if invalid parameter values are associated with the new point and then correcting such invalid parameter values.
Figure 9:
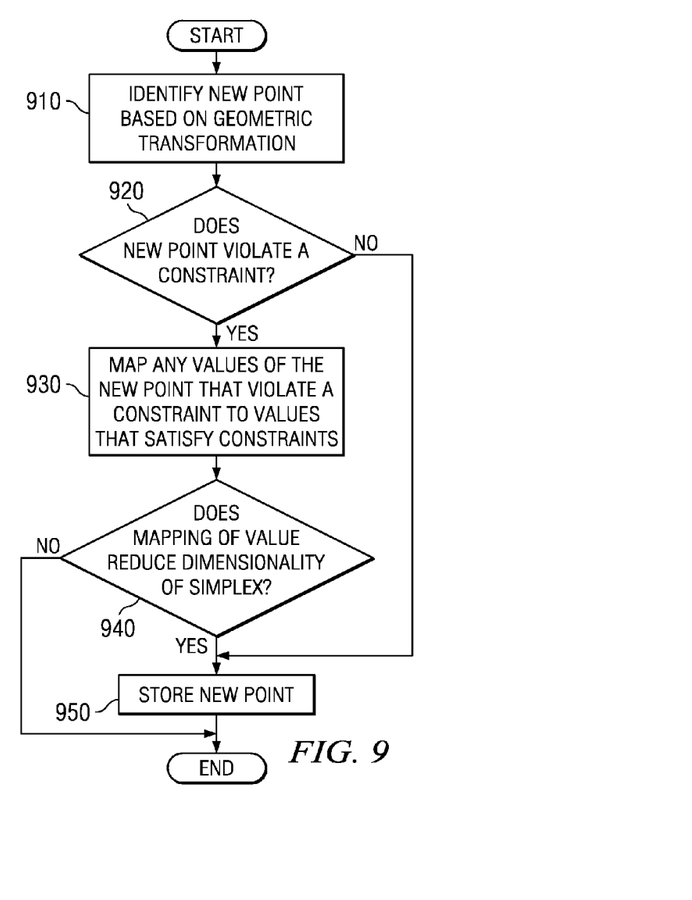
FIG. 9 is a flowchart outlining an exemplary operation for determining whether a new point violates any constraints and correcting the new points so that they remain within constraints.

FIGS. 7-9 are flowcharts that illustrate exemplary operations of the present invention when performing on-line multi-parameter optimization for use with autonomic computing systems. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 7 is a flowchart outlining an exemplary operation of the present invention when performing on-line multi-parameter optimization of configuration parameters for use with an autonomic computing system. As shown in FIG. 7, the operation starts by obtaining an initial simplex (step 710). The utility values for the vertex points of the simplex are then determined (step 715). A geometric transformation based on the vertex points in the simplex is performed so as to find a new point to investigate (step 720). The utility value at this new point is then determined (step 722).

A determination is made as to whether the new point lies outside established thresholds for the size of the simplex (step 725). If so, the new point is mapped to a nearest point on a threshold boundary of the simplex (step 730). Thereafter, or if the new point does not lie outside a threshold boundary, a determination is made as to whether the utility value at this new point is better than a current best valued point in the simplex (step 735). If so, then the worst valued point in the simplex is replaced by the new point (step 740) and the operation returns to step 715. If the utility value of the new point is not better than the current best valued point in the simplex, then a determination is made as to whether the new point is worse than every other point in the simplex (step 745).

If the new point is not worse than every other point in the simplex and all geometric transformations besides contraction has not been applied, a different geometric transformation is used to obtain a new point (step 750) and the operation returns to step 722. If the utility value of the new point is worse than every other point in the simplex and all geometric transformations besides contraction has been applied, the utility value at the current best valued point in the simplex is re-sampled (step 755). A determination is then made as to whether a difference between the newly sampled utility value for the best valued point and the previous utility value for the best valued point is significant, i.e. greater than an established threshold (step 760). If so, it is determined that the environmental conditions have changed and thus, the simplex is expanded (step 765). The operation then returns to step 715. If the difference between the utility values is not significant, then contraction of the simplex is allowed to identify a new point (step 770). A determination is then made as to whether a stopping criteria have been met (step 775). If not, the operation returns to step 722. If the stopping criteria have been met, the best valued point in the simplex is returned and used to configure the autonomic computing system.

It should be appreciated that the utility value of interest is dependent upon the particular implementation of the present invention and may be selected by an administrator as the value that is sought to be optimized. Moreover, the terms "better", "best", "worse" and "worst" are relative terms that may take on different meaning based on the particular utility values being optimized. Thus, for example, a "better" utility value with regard to response time would be a lower overall value, i.e. 0.3 seconds is better than 0.5 seconds. However, for a utility value of number of packets processed per cycle, a higher value would be better than a lower value. Even though these terms are relative, one of ordinary skill in the art is well aware of what constitutes "better" and "worse" with regard to the particular utility values selected for optimization.

Within steps 720, 730, 750, 765, and 770, additional functionality according to the present invention may be performed in order to ensure that the new points identified by these operations do not result in invalid values, values that violate constraints, or values that reduce the dimensionality of the simplex. FIG. 8 is a flowchart outlining a process by which a new point is checked to determine if invalid parameter values are associated with the new point and then correcting such invalid parameter values. As shown in FIG. 8, the operation starts by identifying a new point (step 810). A determination is made as to whether any integer valued parameters have been transformed to a real value (step 820). If so, the real value is mapped to a nearest integer value (step 830). A determination is then made as to whether the mapping of the real value causes a reduction in dimensionality of the simplex (step 840). If so, a small amount of random perturbation is added to the mapped value (step 850). Thereafter, or if there are no integer values transformed to real values (step 820) or the mapping does not cause reduction in dimensionality of the simplex (step 840), the new point is stored (step 860) and the operation terminates.

FIG. 9 is a flowchart outlining an exemplary operation for determining whether a new point violates any constraints and correcting the new points so that they remain within constraints. As shown in FIG. 9, the operation starts by identifying a new point (step 910). A determination is made as to whether any parameter values of the new point violate an established constraint (step 920). If so, the values that are in violation of a constraint are mapped to nearest values that satisfy the constraints (step 930). For example, the point may be assigned a utility value that is equal to the utility value of the nearest point that satisfies the constraint, minus a penalty value. A determination is then made as to whether the mapping of the values causes a reduction in the dimensionality of the simplex (step 940). If the new point does not violate a constraint (step 920) or the mapping does not reduce the dimensionality of the simplex (step 940), the new point is stored (step 950). The operation then terminates.

Thus, the present invention provides a mechanism for dynamically optimizing autonomic computing systems by analyzing, on-line, the configuration parameters and their resulting utility values of the autonomic computing system to determine the optimum settings of these configuration parameters. With the present invention, an autonomic computing system may be periodically reconfigured so that optimum operation of the autonomic computing system is achieved.

One type of autonomic computing system for which the present invention may be utilized is the logging and recovery subsystem of the content-based publish-subscribe (pub-sub) system called Gryphon, available from International Business Machines, Inc. Gryphon is deployed as a redundant overlay network of brokers for filtering and routing messages from publishers to subscribers. The Gryphon project has developed scalable algorithms for rapidly filtering messages through large numbers of overlapping filters, and to selectively route messages in a multi-hop network to those neighbors that are on a path towards matching subscribers.

Recently, a guaranteed delivery (GD) service for exactly one delivery of messages to subscribers has been implemented in Gryphon. Informally, each publisher in the system is the source of an ordered event stream. Guaranteed delivery ensures that any subscriber who remains connected to the system sees a gapless filtered subsequence of this stream, starting from an initial point in time. A subsequence of the event stream is said to be gapless if for any two adjacent events in this stream, there is no event in the original stream that is between these events and matches the subscriber's filter. The guarantee must be honored in the presence of broker failures and link failures. More information about the Gryphon system and the logging and recovery subsystem may be found in Bagchi et al., "Design and Evaluation of a Logger-based Recovery Subsystem for Publish-Subscribe Middleware," International Symposium on Performance Evaluation of Computer and Telecommunication Systems (SPECTS 2002), San Diego, Calif., which is hereby incorporated by reference The system configuration, the workload characteristics, and the failure characteristics of the brokers or the links between the brokers can all vary widely from one deployment of the Gryphon system to another. The logging and recovery subsystem (hereafter referred to as the "logger subsystem") within Gryphon has several different control parameters and for any particular Gryphon deployment, substantial manual tuning and system knowledge is necessary to determine the settings that result in better performance. Naturally, this assumes that performance metrics of interest have been defined a priori.

The present invention was applied to the logger subsystem of Gryphon with the purpose of autonomically tuning the control parameters of the logger subsystem for superior performance in failure-free conditions and under failure injection conditions. With the application of the present invention to the logger subsystem of Gryphon, three metrics are defined that capture important performance and resource utilization characteristics of the Gryphon system as well as the logger subsystem. Four control parameters that have the most significant impact on the logger subsystem's performance under typical workload conditions are utilized in the optimization performed by the present invention: growth threshold, reclaim, suspend threshold, and ration of chunk size and message size. The optimization mechanism of the present invention is utilized to search the parameter space to find control parameter settings that result in improved performance in the Gryphon system.

As mentioned above, the four control parameters used in the application of the present invention to optimization of the logger subsystem are growth threshold, reclaim, suspend threshold and ratio of chunk size and message size. The growth threshold (g) is a control parameter that defines when a cleaner task is scheduled to run. Thus, for example, the growth threshold may designate that the cleaner task is scheduled to run when the log size grows by more than the threshold of g % between two consecutive measurements of the size of the log space.

The reclaim control parameter (r) identifies the amount of log space that is reclaimed when the cleaner task is scheduled. That is, for example, the cleaner task may reclaim r % of the most recent measure of the log size from the log space.

The suspend threshold (s) identifies when writes to the log are suspended. Thus, for example, the cleaner task typically runs concurrently with the normal writes to the log. However, if the log size grows by more than s % of the last sampled log size during the cleaning, all further new writes (as opposed to cleaning writes) to the log are suspended.

The ratio of chunk size and message size (z) is a measure of the relative size of the chunks of log space being allocated and deallocated to the size of the messages being used by the publishing clients. That is, the logger subsystem manages the physical log space through allocation or deallocation of disk space in units of a chunk-size which is a tunable parameter in the subsystem. There are relationships between the control parameters that must be adhered to in order to obtain proper operation of the logger subsystem. For example, r must be greater than g so that the cleaner tasks can reclaim at least as much log space as it has grown. Otherwise, the log size will grow in an unbounded fashion leading to a throttling of the writes to the system. Similarly, s must be greater than g. If this condition is not met, normal writes to the system will be suspended when the cleaner task is scheduled to run. These constraints are important in that they reduce the size of the search space of the parameter values that must be explored.

The effects of these control parameters on the logger subsystem is measured with regard to three performance metrics which capture the essential performance and resource utilization characteristics that are of interest to a user of the Gryphon system. These performance metrics include variation of log space usage, cleaning overhead, and latency. Variation of log space usage. (v) is the ratio of the standard deviation of the disk space usage to the mean disk space usage. Since the cleaner task is scheduled only intermittently, the size of the disk space utilized by the logger subsystem can vary over time. A large variation would require over provisioning of storage space in the system and would also result in oscillatory behavior of the system.

Cleaning overhead (c) represents the overhead associated with the cleaning of the log space. The cleaning of the log space can be looked upon as an overhead in the system that reduces the bandwidth available to the normal writes. The value c denotes the measure of the overhead due to cleaning and it is defined as the ratio of the number of puts due to cleaning to the total number of puts to the system.

Latency (l) is the difference between actual latency and the latency in the system under ideal conditions, i.e. when there is no overhead due to the cleaning tasks. When the cleaner task is executing, the normal writes contend with the cleaning writes leading to an increase in latency for the normal writes. In particular, the overhead due to the logger subsystem results in a time delay between the initiation of a put to the Gryphon system and the time when both the corresponding write has been committed to stable storage and the call-back has been returned from the logger subsystem.

From a system designer or a system administrator's view, the above three metrics highlight the conflicting requirements for performance and resource utilization in the Gryphon system.

To characterize the overall behavior of the Gryphon system for a particular setting of the four control parameters, a scalar penalty measure P is defined that is a function of the three performance metrics:

$$P = w_v f_v(v) + w_c f_c(c) + w_l(l)$$

where $$F_v(v) = v \text{ if } v < 0.1; \text{Exp}(v) \text{ otherwise}$$

$$F_c(c) = c \text{ if } c < 0.2; \text{Exp}(c) \text{ otherwise}$$

and $w_v$, $w_c$, $w_l$, are the positive weights assigned to the three metrics in determining P. In a typical deployment, latency l in the Gryphon system will be the most important criterion followed by the cleaning overhead c, giving $w_l > w_c > w_v$. The functions $f_v$ and $f_c$ emphasize the goal of maintaining the system in parameter regimes which return low values of v and c, respectively.

In the application of the present invention to the logger subsystem, the three parameters g, r and s are restricted to only integer values in the range 0% to 100% subject to the two constraints mentioned earlier. For the control parameter z, a ranged of values between 64 and 1280 is utilized assuming that typical messages range in size from 10 Bytes to 2000 Bytes, with the chunk size remaining fixed at 128 Kbytes.

Figure 10:
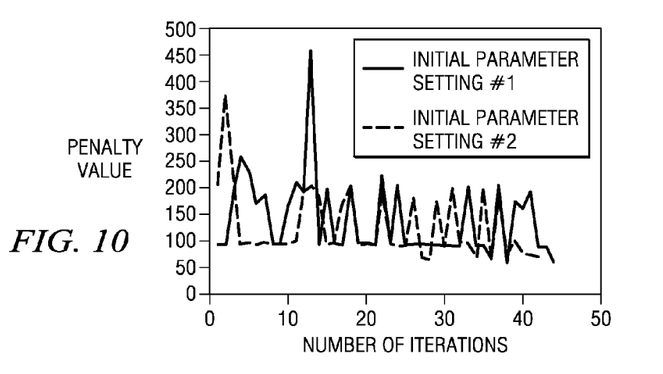
FIG. 10 is a plot of penalty value versus number of iterations for two experimental applications of the present invention to the logger subsystem of the Gryphon system where no faults are injected into the system.

The optimization system and method of the present invention was applied to the control parameters and metrics described above under the above conditions. The optimization system and method was applied with no faults being injected and with faults being injected. The results of the application of the present invention are shown in FIGS. 10. FIG. 10 shows the time-series of penalty values obtained in two typical experiments where the present invention was used for online optimization of the control parameters with Gryphon running under fault injection conditions where the Gryphon system was experiencing message delays. The initial values of the control parameters are chosen close to the estimated best settings of the logger subsystem.

FIG. 10 shows that the initial iterations of the experiments are associated with large fluctuations in the penalty values as the present invention explores the space of control parameters. Once the present invention finds good parameter regions, the fluctuations tend to die down and the system converges to similar penalty values and control parameter settings for different starting points. FIG. 10 also shows that, in spite of the noise associated with the penalty measure, the present invention is able to find penalty values that are, on average, superior to penalty values associated with the estimated best settings of the control parameters. For this experiment, the present invention finds the following near-optimal values:

Growth (g)=25%
Reclaim (r)=27%
Suspend (s)=49%
Ratio Chunk/Message=119 Bytes

The penalty values obtained in the above experiment are much higher than in the fault-free case. Also the parameter settings obtained by the present invention at the end of the runs are different from those in the fault-free case. Hence, if the system were manually tuned under fault-free conditions, the system performance would no longer be optimal if the runtime environment had failures. This underscores the need for the present invention.

Another type of autonomic computing system for which the present invention may be utilized is the Apache v1.3 Web server. Apache v1.3 on Unix is structured as a pool of worker processes monitored by a master process. The master process monitors the health of the worker processes and manages their creation and destruction. The worker processes are responsible for handling the communications with the Web clients as well as performing the work required to generate the responses to the requests from the Web clients. A worker process handles at most one connection at a time, and it continues to handle only that connection until the connection is terminated. Thus, the worker is idle between consecutive requests from its connected client.

There are two main parameters to control the response time of the Apache web server: MaxClients and KeepAlive Timeout. The MaxClients parameter limits the size of this worker pool, thereby imposing a limitation on the processing capacity of the server. A higher MaxClients value allows Apache to process more client requests. But if MaxClients is too large, there are excessive resource utilizations that degrade performance for all clients, i.e., longer response time. The Apache "KeepAlive Timeout" tuning parameter controls the maximum time a worker process can remain in the "User Think" state before its client connection is closed. If KeepAlive is too large, CPU and memory are underutilized since clients with requests to process cannot connect to the server, and so the clients experience long response times. Reducing the timeout value means that workers spend less time in the "User Think" state, and more time in the "Busy" state. Hence, CPU increases and the response time decreases. If the timeout is too small, the TCP connection terminates prematurely and reduces the benefits of having the persistent connections. The extra overheads can make the user response time longer.

The optimization system and method of the present invention was applied to control the MaxClients and KeepAlive Timeout parameters in the Apache Web Server to minimize the response time of the system under simulated static and variable load conditions. As in the Gryphon system, present invention was successfully able to find parameter settings that resulted in superior performance than those obtained from the default parameter settings of the Apache Web Server v 1.3.

Thus, the present invention provides an improved system and method for performing dynamic online multi-parameter optimization for autonomic computing systems that does not suffer from the drawbacks of the known Direct Search methods. The present invention expands upon Direct Search methods to provide additional functionality that permits the modified Direct Search methods to be applied to dynamic and noisy environments, such as eBusiness and eCommerce type systems operating on-line on a network, such as the Internet.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for determining configuration parameter value settings for a computing device to optimize an operational characteristic of the computing device, comprising:
obtaining a simplex of points, wherein each point in the simplex represents a set of configuration parameters for the computing device;
performing a geometric transformation on the simplex of points to identify a new point to investigate;
sampling the operational characteristic at the new point;
determining if the operational characteristic associated with the new point is worse than a value of the operational characteristic for each point in the simplex of points;
determining a set of points in the simplex that need to be resampled if the new point is worse than a value of the operational characteristic for each point in the simplex of points;
resampling the operational characteristic at each of the points in the set of points; and
determining a new simplex based on the resampled operational characteristic of points in the set of points.

2. The method of claim 1, wherein the set of points comprises a best point in the simplex of points, and wherein determining a new simplex based on the resampled operational characteristic of points in the set of points includes determining whether to expand or contract the simplex based on the resampling of the operational characteristic at the best point in the simplex of points to obtain the new simplex.

3. The method of claim 1, further comprising:
extending the simplex in a direction of the new point if the operational characteristic of the new point is better than values of the operational characteristic for each point in the simplex of points.

4. The method of claim 1, further comprising:
assigning an upper threshold and a lower threshold to a size of the simplex;
and limiting expansion or contraction of the simplex based on the assigned upper and lower thresholds.

5. The method of claim 4, wherein the lower threshold on the size of the simplex represents a lowest resolution of significance for each of the parameters of the simplex.

6. The method of claim 4, wherein if one or more of the configuration parameter values associated with the new point violates one of the upper threshold and lower threshold, the new point is mapped to a point closest to the new point whose associated configuration parameter values satisfy the upper threshold or lower threshold.

7. The method of claim 2, wherein determining whether to expand or contract the simplex based on the resampling of the operational characteristic at the best point in the simplex of points includes:
comparing a resampled operational characteristic value for the best point to a previous operational characteristic value for the best point;
and determining whether to expand or contract the simplex based on a difference between the resampled operational characteristic value and the previous operational characteristic value.

8. The method of claim 7, wherein if the difference is greater than a threshold, the simplex is expanded.

9. The method of claim 7, wherein if the difference is not greater than a threshold, then the simplex is contracted.

10. The method of claim 1, wherein configuration parameter values for points in the simplex may include both real and integer configuration parameter values.

11. The method of claim 10, further comprising:
checking the dimensionality of the modified simplex obtained by expanding or contracting the simplex;
and not performing the expansion or contraction if the modified simplex would have a different dimensionality from the simplex.

12. The method of claim 1, further comprising:
converting configuration parameter values of the new point to one of integer and real values based on a value type for the configuration parameters;
checking the converted configuration parameter values to determine if a dimensionality of the simplex is changed by the conversion of the configuration parameters;
and setting the converted configuration parameter values of the new point that result in a change in the dimensionality of the simplex to converted configuration parameter values that do not reduce the dimensionality of the simplex.

13. The method of claim 12, wherein setting the converted configuration parameter values of the new point that result in a change in the dimensionality of the simplex to converted configuration parameter values that do not reduce the dimensionality of the simplex includes:
setting the converted configuration parameter values to converted configuration parameter values that equal the converted configuration parameter values minus a penalty value.

14. The method of claim 13, wherein the penalty value is a quadratic function of a distance between an original configuration parameter value of the new point and the converted configuration parameter value.

15. The method of claim 1, further comprising:
using configuration parameter values of the best point in the simplex to configure the computing device if no improvement of the simplex is obtainable.

16. A computer program product in a non-transitory computer readable storage medium for determining configuration parameter value settings for a computing device to optimize an operational characteristic of the computing device, comprising:
first instructions for obtaining a simplex of points, wherein each point in the simplex represents a set of configuration parameters for the computing device;
second instructions for performing a geometric transformation on the simplex of points to identify a new point to investigate;
third instructions for sampling the operational characteristic at the new point;
fourth instructions for determining if the operational characteristic associated with the new point is worse than a value of the operational characteristic for each point in the simplex of points;
fifth instructions for determining a set of points in the simplex that need to be resampled if the new point is worse than a value of the operational characteristic for each point in the simplex of points;
sixth instructions for resampling the operational characteristic at each of the points in the set of points;

and seventh instructions for determining a new simplex based on the resampled operational characteristic of points in the set of points.

17. The computer program product of claim 16, wherein the set of points comprises a best point in the simplex of points, and wherein the seventh instructions for determining a new simplex based on the resampled operational characteristic of points in the set of points include instructions for determining whether to expand or contract the simplex based on the resampling of the operational characteristic at the best point in the simplex of points to obtain the new simplex.

18. The computer program product of claim 16, further comprising:
eighth instructions for extending the simplex in a direction of the new point if the operational characteristic of the new point is better than values of the operational characteristic for each point in the simplex of points.

19. The computer program product of claim 16, further comprising:
eighth instructions for assigning an upper threshold and a lower threshold to a size of the simplex;
and ninth instructions for limiting expansion or contraction of the simplex based on the assigned upper and lower thresholds.

20. The computer program product of claim 19, wherein the lower threshold on the size of the simplex represents a lowest resolution of significance for each of the parameters of the simplex.

21. The computer program product of claim 19, wherein if one or more of the configuration parameter values associated with the new point violates one of the upper threshold and lower threshold, the new point is mapped to a point closest to the new point whose associated configuration parameter values satisfy the upper threshold or lower threshold.

22. The computer program product of claim 17, wherein the instructions for determining whether to expand or contract the simplex based on the resampling of the operational characteristic at the best point in the simplex of points include:
instructions for comparing a resampled operational characteristic value for the best point to a previous operational characteristic value for the best point;
and instructions for determining whether to expand or contract the simplex based on a difference between the resampled operational characteristic value and the previous operational characteristic value.

23. The computer program product of claim 22, wherein if the difference is greater than a threshold, the simplex is expanded.

24. The computer program product of claim 22, wherein if the difference is not greater than a threshold, then the simplex is contracted.

25. The computer program product of claim 16, wherein configuration parameter values for points in the simplex may include both real and integer configuration parameter values.

26. The computer program product of claim 25, further comprising:
eighth instructions for checking the dimensionality of the modified simplex obtained by expanding or contracting the simplex;
and ninth instructions for not performing the expansion or contraction if the modified simplex would have a different dimensionality from the simplex.

27. The computer program product of claim 16, further comprising:
eighth instructions for converting configuration parameter values of the new point to one of integer and real values based on a value type for the configuration parameters;
ninth instructions for checking the converted configuration parameter values to determine if a dimensionality of the simplex is changed by the conversion of the configuration parameters;
and tenth instructions for setting the converted configuration parameter values of the new point that result in a change in the dimensionality of the simplex to converted configuration parameter values that do not reduce the dimensionality of the simplex.

28. The computer program product of claim 27, wherein the tenth instructions for setting the converted configuration parameter values of the new point that result in a change in the dimensionality of the simplex to converted configuration parameter values that do not reduce the dimensionality of the simplex include:
instructions for setting the converted configuration parameter values to converted configuration parameter values that equal the converted configuration parameter values minus a penalty value.

29. The computer program product of claim 28, wherein the penalty value is a quadratic function of a distance between an original configuration parameter value of the new point and the converted configuration parameter value.

30. The computer program product of claim 16, further comprising:
eighth instructions for using configuration parameter values of the best point in the simplex to configure the computing device if no improvement of the simplex is obtainable.

31. An apparatus for determining configuration parameter value settings for a computing device to optimize an operational characteristic of the computing device, comprising:
means for obtaining a simplex of points, wherein each point in the simplex represents a set of configuration parameters for the computing device;
means for performing a geometric transformation on the simplex of points to identify a new point to investigate;
means for sampling the operational characteristic at the new point;
means for determining if the operational characteristic associated with the new point is worse than a value of the operational characteristic for each point in the simplex of points;
means for determining a set of points in the simplex that need to be resampled if the new point is worse than a value of the operational characteristic for each point in the simplex of points;
means for resampling the operational characteristic at each of the points in the set of points;
and means for determining a new simplex based on the resampled operational characteristic of points in the set of points.

32. A method of configuring a computing device by optimizing configuration parameter value settings, comprising:
obtaining a simplex of points, wherein each point in the simplex represents a set of configuration parameters for the computing device, and wherein each point has a corresponding operational characteristic value associated with the point;
performing one or more geometric transformations on the simplex based on the operational characteristic values associated with the points of the simplex to identify a new points to investigate;

measuring a value of the operational characteristic based on a set of configuration parameters associated with the new points;

and configuring the computing device based on values of a set of configuration parameters associated with a best point in a resulting simplex, wherein performing the one or more geometric transformations includes checking the new points obtained from performing the one or more geometric transformations to determined if one or more conditions are violated and wherein the conditions are set so as to compensate for dynamic and noisy operating environments of the computing device.

33. The method of claim 32, wherein performing the one or more geometric transformations includes:

applying an upper and lower limit on a size of the simplex;
comparing new point configuration parameter values against the upper and lower limit;
and adjusting the new point configuration parameter values based on the comparison.

34. The method of claim 32, wherein performing the one or more geometric transformations includes:

permitting both real and integer valued configuration parameter values;
determining if new point configuration parameter values result in a reduction in dimensionality of the simplex;
and adjusting the new point configuration parameter values based on the determination.

35. The method of claim 32, wherein performing the one or more geometric transformations includes:

resampling the operational characteristic at a best point in the simplex if a geometric transformation does not result in a new point whose configuration parameter values result in a better operational characteristic value;
comparing a resampled operational characteristic value of the best point to an original operational characteristic value of the best point; and
determining whether to expand or contract the simplex based on the comparison.

* * * * *